United States Patent [19]

Bloemers

[11] Patent Number: 4,648,254
[45] Date of Patent: Mar. 10, 1987

[54] OUTBOARD MOTOR LOCK

[75] Inventor: James L. Bloemers, Fond du Lac, Wis.

[73] Assignee: Brunswick Corporation, Skokie, Ill.

[21] Appl. No.: 811,801

[22] Filed: Dec. 20, 1985

[51] Int. Cl.[4] .............................................. F16B 41/00
[52] U.S. Cl. .......................................... 70/232; 70/58; 70/212
[58] Field of Search ................... 70/58, 209, 212, 232

[56] References Cited

U.S. PATENT DOCUMENTS

| | | | |
|---|---|---|---|
| 2,641,124 | 6/1953 | Gallagher | 70/232 |
| 2,883,850 | 4/1959 | Falck | 70/232 |
| 3,067,846 | 12/1962 | Luebkeman | 70/232 |
| 3,650,130 | 3/1972 | Thompson | 70/58 |
| 3,739,608 | 6/1973 | Young | 70/209 |
| 3,745,797 | 7/1973 | Pavek | 70/232 |
| 3,808,851 | 5/1974 | Kargus et al. | 70/232 |
| 3,889,500 | 6/1975 | Hix | 70/212 |
| 3,943,738 | 3/1976 | Foote | 70/232 |
| 4,030,324 | 6/1977 | Rizio | 70/212 |
| 4,041,738 | 8/1977 | Vann | 70/212 |
| 4,557,458 | 12/1985 | Vahlberg | 70/232 |

FOREIGN PATENT DOCUMENTS

| | | | |
|---|---|---|---|
| 1366079 | 9/1974 | United Kingdom | 70/212 |
| 1561318 | 2/1980 | United Kingdom | 70/232 |

Primary Examiner—Henry E. Raduazo
Attorney, Agent, or Firm—O. T. Sessions

[57] ABSTRACT

A locking device (15) for preventing loosening of the clamp screw (13) and removal of the clamp bracket (11) of an outboard motor from the transom (10) of a boat. The locking device (15) has a tubular member (16) with holes (20, 21, 22) to accommodate the clamp handle (14), an arm of the clamp bracket (11), and a padlock (17). The tubular member (16) fits coaxially over the clamp screw (13) to protect the screw.

4 Claims, 3 Drawing Figures

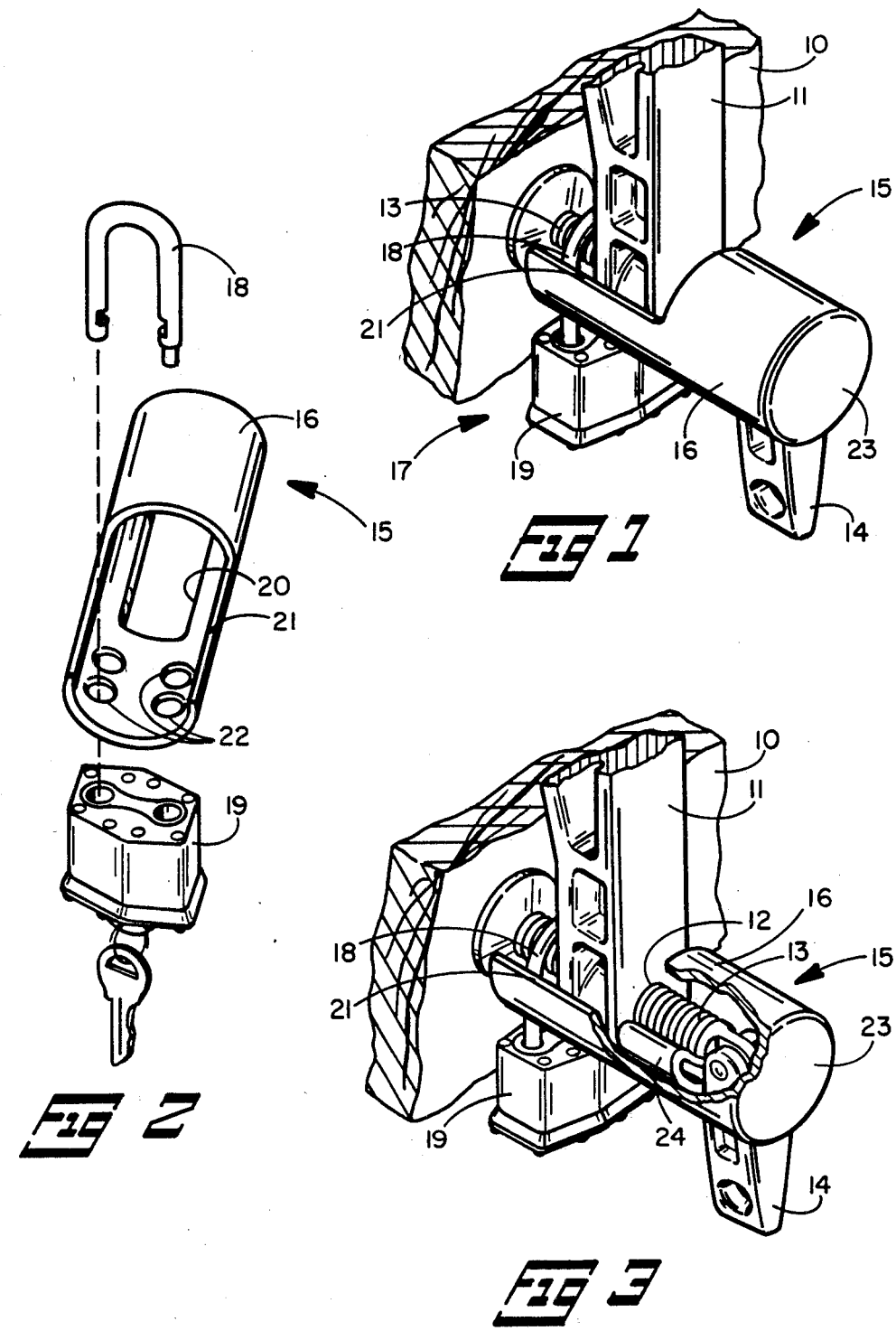

4,648,254

OUTBOARD MOTOR LOCK

DESCRIPTION

1. Technical Field

This invention relates to locking devices and more particularly to devices for locking the mounting bracket of an outboard motor.

2. Background Art

Outboard motors are typically provided with a bracket and screw clamp means for attaching the outboard motor to the transom of a boat. A number of locking devices have been proposed to prevent unauthorized removal of the outboard motor from the boat. U.S. Pat. No. 3,650,130 to Thompson, U.S. Pat. No. 3,745,797 to Pavek, U.S. Pat. No. 3,808,851 to Kargus et al, and U.S. Pat. No. 3,943,738 to Foote are representative of some of the prior devices. The foregoing locking devices all engage the handles of the clamp screws to prevent unscrewing the clamp screws without removal of the locking device. These devices provide no protection for the end of the clamp screw which engages the transom of the boat.

3. Disclosure of Invention

An object of the present invention is to provide a locking device for outboard motors which protects the clamp screw from damage while preventing turning of the clamp screw.

Another object of the invention is to provide a locking device which is low in cost and does not interfere with the normal operation of the outboard motor.

To accomplish the foregoing objectives, the present invention provides a locking device for outboard motors having a clamp bracket, a clamp screw threadedly engaging one end of the clamp bracket, and a clamp handle pivotally attached to one end of the clamp screw. The locking device includes a tubular member adapted to fit coaxially over the clamp screw. The tubular member includes a hole through its wall near one end to allow the clamp handle to pass through, and a slot through its wall at its other end to allow the end of the clamp bracket to fit in the slot. A locking means at the slotted end of the tubular member engages the clamp screw on the side of the clamp bracket opposite the clamp handle to lock the slotted end of the tubular member to the clamp screw.

Preferably the tubular member includes a locking hole through its wall opposite the slot to engage a portion of the locking means.

The locking device can include a U-shaped member extending through the locking hole to engage the clamping screw.

Preferably a cap is affixed to the end of the tubular member opposite the slot.

In the preferred embodiment, the locking means takes the form of a padlock having a U-shaped shackle which can be inserted through the locking hole to engage the clamping screw and a padlock body engaging the two ends of the U-shaped shackle.

The locking device can include a plurality of locking holes to allow both ends of the U-shaped shackle to pass through the holes and to provide for different locations for the padlock.

BRIEF DESCRIPTION OF THE DRAWINGS

FIG. 1 is a partial sectional view of the clamp bracket of an outboard motor showing the locking device of the invention in place.

FIG. 2 is a view like FIG. 1 partially broken away to show details of the locking device.

FIG. 3 is an exploded view of the locking device.

BEST MODE FOR CARRYING OUT THE INVENTION

FIGS. 1 and 2 show the portion of an outboard motor which attaches to the transom 10 of a boat. An arm 11 of the clamp bracket includes a threaded hole 12 engaging a clamp screw 13. A clamp handle 14 is pivotally attached to the clamp screw 13 to allow manipulation of the screw 13 to clamp against the transom 10 of the boat. Typically an outboard motor will have a clamp bracket with two arms 11 supporting two clamping screws 13, though only one is illustrated in the present drawings.

The locking device 15 of the invention includes a generally tubular member 16 and a locking means consisting of a padlock 17 having a removable U-shaped shackle 18 and a padlock body 19 for locking the shackle 18 to the body 19.

The tubular body 16 includes an elongated hole 20 through the cylindrical wall at the end remote from the boat transom 10 to accommodate the clamp handle 14. The upper portion of the tubular body 16 is cut away to form a slot 21 at the end of the body 16 nearest the transom 10 to accommodate the arm 11 of the clamp bracket. Preferably the width of the slot 21 is only slightly larger than the width of the clamp bracket arm 11. Two pairs of locking holes 22 are provided through the cylindrical wall of the tubular body 16 opposite the slot 21. These holes 22 are spaced to accommodate the shackle 18 of the padlock 17.

The tubular body 16 is formed from a short length of SAE 1095 steel tube. After the slot 21 and holes 20 and 22 are cut through the tube, a cap 23 is welded to the end of the tube. Finally, the tubular member 16 is case hardened and heat treated for maximum hardness.

The locking device 15 of the invention may be installed on the clamping screw 13 and clamp bracket 11 of the outboard motor by first turning the clamping screw 13 so the clamp handle 14 will hang in a generally vertical direction. The tubular member 16 is then slipped over the clamping screw 13 with the clamp handle 14 dropping through the elongated hole 20. The U-shaped shackle member 18 may then be placed over the clamp screw 13 and through the two locking holes 22 closest to the clamp bracket arm 11. The padlock body 19 is then attached to the shackle 18 in a conventional fashion to lock the tubular member 16 in place over the clamping screw 13. A piece of rubber tubing 24 may be compressed between the tubular body 16 and the clamping screw 13 during installation, as shown in FIG. 2, to prevent rattling of the locking device after it has been installed.

The locking device of the invention protects essentially the full length of the clamping screw 13 from access by ordinary cutting tools. A thief would thus have a difficult time removing the locking device 15 without seriously damaging the clamp bracket 11, since the clamping screw 13 cannot be readily cut.

I claim:

1. A locking device for outboard motors having a clamp bracket, a clamp screw threadedly engaging one end of the clamp bracket, and a clamp handle pivotally attached to one end of the clamp screw, said locking device comprising:
   (A) a tubular member, said tubular member adapted to fit coaxially over the clamp screw, said tubular member including a hole through its wall near one end to allow the clamp handle to pass through, a slot through its wall and open at the other end to allow the end of the clamp bracket to fit in said slot, and a locking hole through a wall opposite said slot to engage a portion of said locking means; and
   (B) a locking means at the slotted end of said tubular member to lock the slotted end of said tubular member to the clamp screw, said locking means engaging the clamp screw on the side of the clamp bracket opposite the clamp handle, said locking means including a padlock, said padlock having a U-shaped shackle extending through said locking hole to engage said clamping screw and a padlock body engaging the two ends of said U-shaped shackle.

2. The locking device defined in claim 1 wherein said tubular member includes a cap affixed to its end opposite said slot.

3. The locking device defined in claim 1 wherein said tubular member includes a second locking hole adjacent said first locking hole to allow said shackle to extend through both of said locking holes.

4. The locking device defined in claim 3 wherein said tubular member includes third and fourth locking holes axially spaced from said first and second locking holes to provide a second location for said padlock.

* * * * *